United States Patent [19]

Kamide et al.

[11] Patent Number: 4,634,470
[45] Date of Patent: Jan. 6, 1987

[54] CELLULOSE DOPE, PROCESS FOR PREPARATION AND METHOD FOR APPLICATION THEREOF

[75] Inventors: Kenji Kamide, Ikoma; Kunihiko Okajima, Takatsuki, both of Japan

[73] Assignee: Asahi Kasei Kogyo Kabushiki Kaisha, Japan

[21] Appl. No.: 675,762

[22] Filed: Nov. 28, 1984

[30] Foreign Application Priority Data

Dec. 26, 1983 [JP] Japan .............................. 58-244337

[51] Int. Cl.⁴ .............................................. C08L 1/00
[52] U.S. Cl. .................. 106/163.1; 106/165; 106/203; 536/56
[58] Field of Search ...................... 106/163.1, 165, 203; 536/56

[56] References Cited

U.S. PATENT DOCUMENTS 2,978,446  4/1961  Battista ................................... 536/56
3,388,119  6/1968  Cruz ....................................... 536/56
3,758,458  9/1973  Dyer ...................................... 106/165

*Primary Examiner*—Theodore Morris
*Attorney, Agent, or Firm*—Finnegan, Henderson, Farabow, Garrett and Dunner

[57] ABSTRACT

Described is a cellulose dope which is an aqueous alkali solution containing substantially at least 3% by weight of cellulose having a degree of polymerization of at least 100, wherein in the $^{13}$C-NMR spectrum of the cellulose, the $C_4$-position carbon peak is found at a magnetic field higher by at least 7 ppm than the magnetic field of the $C_4$-position carbon peak of solid cellulose attributed to the strong intramolecular hydrogen bond. This dope is prepared by maintaining a mixture comprising 100 weight parts of cellulose, which may have any crystal form, and 10 to 1000 weight parts of a hydrogen bond-cleaving solution at 100° C. to 350° C. under a pressure of 10 to 250 atmospheres, promptly exposing the mixture to the ambient atmosphere, mixing the resulting cellulose with an aqueous alkali solution maintained at a temperature not higher than 50° C., and then stirring the mixture at a temperature not higher than 10° C. to dissolve the cellulose in the aqueous alkali solution. The dope may be used for the manufacture of a shaped article or for coating.

6 Claims, 7 Drawing Figures 3430 cm⁻¹

3430 cm⁻¹

4,634,470

CELLULOSE DOPE, PROCESS FOR PREPARATION AND METHOD FOR APPLICATION THEREOF

BACKGROUND OF THE INVENTION (1) Field of the Invention

The present invention relates to a cellulose dope, a process for the preparation of this dope, a shaped article formed from this dope, and a method for the application of this dope.

(2) Description of the Related Art

Shaped articles of regenerated celluloses are ordinarily prepared by dissolving cellulose in a solvent by appropriate means and introducing the obtained dope into a nonsolvent or regenerating solvent by using an extruder. Even at present the cellulose-dissolving methods that can be used on an industrial scale for this purpose are only the cuprammonium method and viscose method which developed as early as the end of the 1890's. In each of the dopes obtained according to these methods, the cellulose does not dissolve as cellulose itself in the dissolved state but it is dissolved in the form of a certain cellulose derivative. Accordingly, regeneration is necessary for converting this cellulose derivative to the so-called regenerated cellulose. Furthermore, both in the preparation process of dopes according to these methods and in the shaping process from these dopes, many problems arise from the view point of the working environment for labors and environmental pollution because heavy metals are discharged and toxic gases are generated. Although these methods are not utilized industrially, many cellulose-dissolving methods using a metal complex have been known. As the metal complex used for dissolving cellulose, Cadoxene (cadmium/ethylene diamine/alkali), Coxene (cobalt/ ethylene diamine/alkali), Zincoxene (zinc/ethylene diamine/alkali), Nioxene (nickel/ethylene diamine/alkali) and EWNN (iron/tartaric acid/alkali) are noted. However, these methods are not superior to the cuprammonium method or viscose method because toxic components such as heavy metals and amines are used, and thus, these methods are disadvantageous from an economical viewpoint.

The viscose method using carbon disulfide is now adopted by the majority of enterprises in the industry of regenerated celluloses. However, in Europe and America, manufacturers have become apprehensive about industrial continuation of the viscose method because of the above-mentioned problems, and thus many enterprises withdrew from the viscose rayon industry in the 1960's and 1970's. In order to overcome the defects of the known cellulose-dissolving methods, a method for obtaining novel regenerated cellulose shaped articles such as fiber and film in a closed system by dissolving cellulose directly in an organic solvent has been sought since the 1970's, mainly in Canada and the U.S.A., and as a result, various methods have been developed and proposed. However, these methods use a complicated multi-component solvent system which is very expensive, and none of these methods have been used yet in practice because of toxicity, explosiveness and difficulties in recovering the solvents. Moreover, these newly developed methods are very similar to the viscose method or cuprammonium method in the technical idea of converting cellulose to a certain derivative and dissolving the cellulose in the form of this derivative. For example, in the method of using dimethylsulfoxide/paraformaldehyde, cellulose is dissolved in the form of methylol cellulose, and in the method of using dimethylformamide/$N_2O_4$, cellulose is dissolved in the form of cellulose nitrite. Also, in the method of using $SO_2$/amine and the method of using dimethylformamide/chloral, cellulose is dissolved in the form of a derivative. As is apparent from the abovementioend history of cellulose-dissolving techniques, it is extremely difficult to dissolve cellulose in a simple and cheap solvent.

It is known that if the degree of polymerization (hereinafter referred to as "DP") of cellulose is extremely low (for example, DP = 10), the cellulose is soluble in not only an aqueous alkali solution but also hot dimethylsulfoxide. However, the degree of polymerization of this soluble cellulose is necessary lower than 20, and a shaped article made from this cellulose does not have satisfactory mechanical properties and cannot be put to practical use. The reason why cellulose having an extremely low degree of polymerization is soluble in an aqueous alkali solution is that the polymeric characteristics of cellulose, for example, the molecular configuration defined by the hydrogen bond, are lost. It also is known that an aqueous solution containing about 10% by weight of sodium hydroxide shows a strong swelling action to cellulose having a high degree of polymerization. Journal of Prakt. Chem., N.F., 158, 233 (1941) shows the solubilities of natural cellulose, mercerized cellulose, and reprecipitated (probably, regenerated) cellulose in an aqueous 10% by weight solution of sodium hydroxide. Although the dissolving conditions and polymer concentrations are not described, it is taught that natural cellulose and mercerized cellulose are soluble if the polymerization degree (DP) is up to 400 and reprecipitated cellulose is soluble if DP is up to 1200. However, the descriptions include some optional factors and also includes even a highly swollen gel in the category of a "dissolved polymer". From the results of tracing experiments made by us, it has been found that the solubility of cellulose in an aqueous 10% by weight sodium hydroxide solution at −5° C. to 5° C. is influenced by the polymer concentration and the degree of polymerization. For example, in the case of natural cellulose having a degree of polymerization of 360 (cotton linter), when centrifugal separation (at 20000 rpm for 46 minutes) is applied to the dope in order to remove the gel, it has been proved out that the cellulose is not completely dissolved even at a polymer concentration of 0.5% by weight. Accordingly, it is considered that the term "soluble" used in Journal of Prakt. Chem., N.F., 158, 233 (1941) means that cellulose is dissolved at a very low concentration in the gel-containing state. Such a solution of a low concentration is of no practical value. This can be also confirmed from the fact that an aqueous alkali solution was used for the fractional dissolution of celluloses by their lateral order (see, for example, "Purification and Chemical Reaction of Polymeric Substances", pages 128–132, compiled by the Polymer Association and published by Kyoritsu Shuppan in 1958). This fractional dissolution is an operation of separating cellulose into an alkali-soluble portion and an alkali-insoluble portion according to the molecular weight of the cellulose and the aggregation state of the molecular chains, and the former soluble portion even includes a gel. These facts indicate that it is technically very difficult to dissolve substantially all of a cellulose having a high degree of polymerization at a high cellulose concentration in an aqueous alkali solution having a single alkali composition. In fact, a cellulose/alkali solution has not been utilized as a shaping dope in the history of the cellulose industry.

SUMMARY OF THE INVENTION

It is therefore a primary object of the present invention to provide a cellulose dope prepared by dissolving a cellulose having a relatively high degree of polymerization in an aqueous alkali solution at a low temperature, which can be economically advantageously shaped into an excellent fiber, film or other article or applied to the surface or interior treatment of other material by coating or dipping.

Another object of the present invention is to provide a process for the preparation of this cellulose dope and a method for the application of this cellulose dope.

In one aspect of the present invention, there is provided a stable cellulose dope suitable for shaping, which comprises an aqueous alkali solution containing substantially at least 3% by weight of cellulose having a degree of polymerization of at least 100, wherein in the $^{13}$C-NMR spectrum of the cellulose dope, the C$_4$ carbon peak is found at a magnetic field higher by at least 7 ppm than the magnetic field (i.e., 87.8 ppm) of the C$_4$ carbon peak of solid cellulose attributed to the strong intramolecular hydrogen bond.

In another aspect of the present invention, there is provided a process for the preparation of the above-mentioned cellulose dope which comprises: maintaining a mixture comprising 100 parts by weight of a cellulose, which may have any known crystal form, and 10 to 1000 parts by weight of a hydrogen bond-cleaving solution at a temperature of 100° C. to 350° C. under a pressure of 10 to 250 atmospheres, promptly discharging the mixture in the open air, mixing the resulting cellulose with an aqueous alkali solution maintained at a temperature lower than 50° C., and then stirring the mixture at a temperature lower than 10° C. to dissolve the cellulose in the aqueous alkali solution.

In still another aspect of the present invention, there is provided a cellulose shaped article having a well-developed intramolecular hydrogen bond made by passing the above-mentioned cellulose dope through a coagulating bath and then a neutralizing bath by using an ordinary extruder, and thereafter drawing and winding the coagulated cellulose.

In still another aspect of the present invention, there is provided a method of treating an article which comprises: coating or dispersing the above-mentioned dope on the surface of the article or in the interior thereof directly or after dilution, and then neutralizing the applied dope.

DETAILED DESCRIPTION OF THE PREFERRED EMBODIMENTS

Figure 1A:
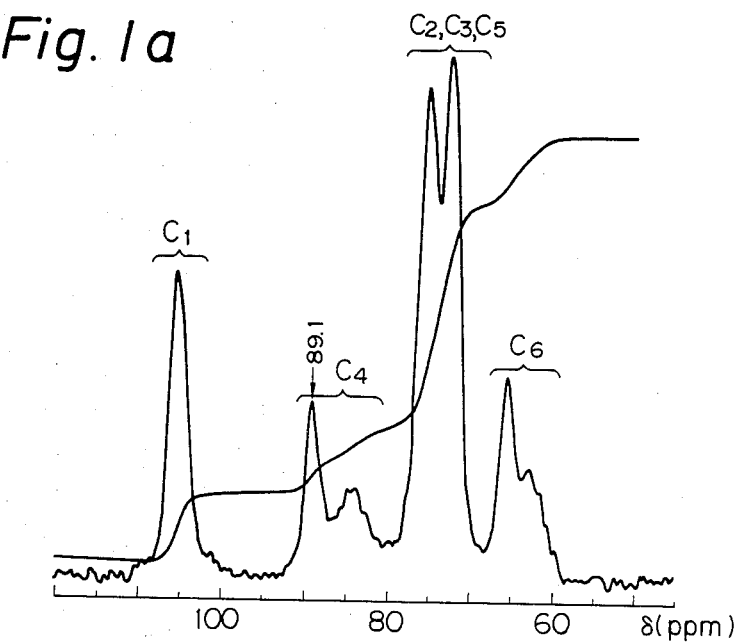
FIGS. 1a and 1b show solid CP/MAS $^{13}$C-NMR spectra of natural cellulose and regenerated cellulose, respectively, in which the peak indicated by the arrow is the C$_4$ carbon peak attributed to the strong intramolecular hydrogen bond.
Figure 1B:
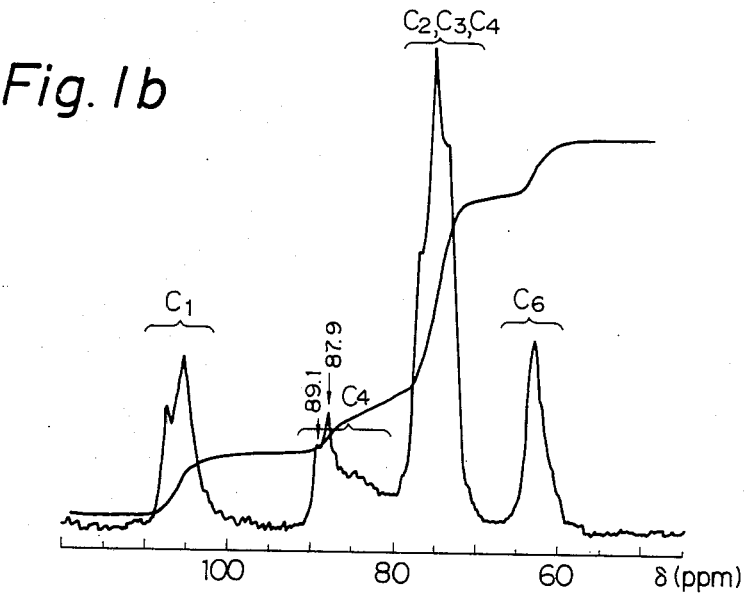
Figure 2:
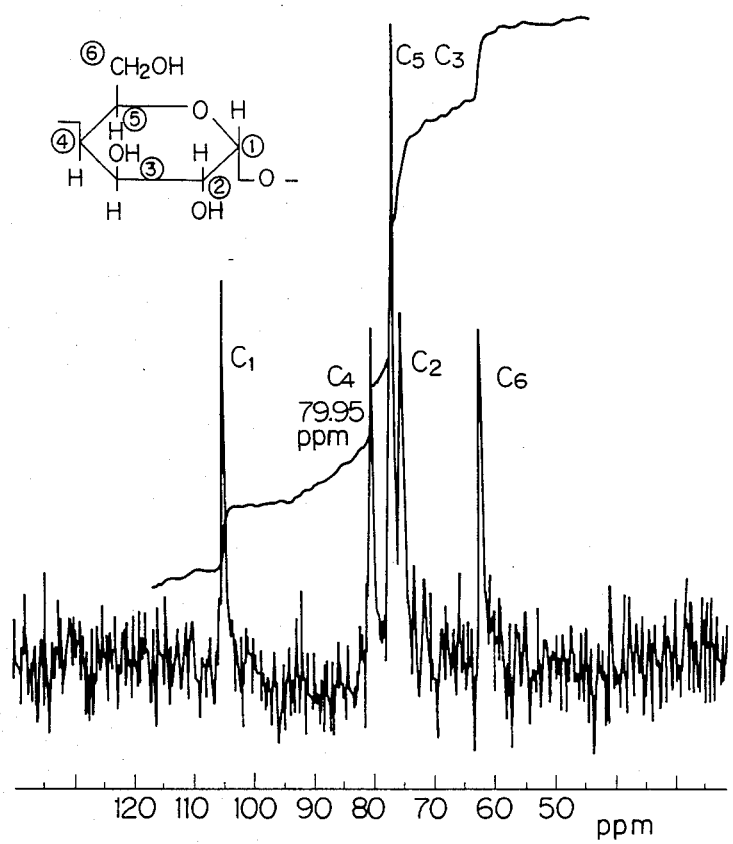
FIG. 2 shows the $^{13}$C-NMR spectrum of the dope of the present invention, in which one sharp peak of the C$_4$ carbon atom is observed.

The present invention provides a stable dope suitable for shaping which contains cellulose at a high concentration. More particularly, the dope of the present invention is an aqueous alkali solution containing at least 3% by weight of cellulose having a degree of polymerization of at least 100, and which is not gelatinized after standing for at least 2 days at room temperature. The most characteristic feature of the dope of the present invention is that in the $^{13}$C-NMR spectrum of the cellulose dope, the peak of the carbon atom present at the C$_4$ in the glucose ring of the cellulose is found at a magnetic field higher by at least 7 ppm than the magnetic field of the C$_4$ carbon peak attributed to the strong intramolecular hydrogen bond present in the crystalline part of solid cellulose (87.8 ppm in the case of cellulose I and 89.1 ppm and 87.8 ppm in the case of cellulose II). Ordinarily, solid cellulose comprises a crystalline part and an amorphous part, and in the $^{13}$C-NMR spectrum, the C$_4$ carbon peak for the former part is observed at the above-mentioned peak position and for the latter part, ranging from 86 ppm to 79 ppm as the broad peak (see FIGS. 1a and 1b) reflecting the difference in the type of the intermolecular and intramolecular hydrogen bonds according to the difference of the crystal form. It is considered that the latter peak consists of various peaks overlapped together according to the degree of destruction of the intramolecular hydrogen bond. Ordinary cellulose is swollen with an aqueous alkali solution. In the $^{13}$C-NMR spectrum of this swollen cellulose solution, the C$_4$ carbon peak is broad, and is not found as a single sharp peak at a magnetic field higher by at least 7 ppm than the magnetic field of 87.8 ppm of the above-mentioned peak. On the other hand, in the $^{13}$C-NMR spectrum of an aqueous alkali solution of the cellulose of the present invention, the C$_4$ carbon peak is observed as a single sharp peak at a magnetic field higher by at least 7 ppm than the above-mentioned standard peak of 87.8 ppm (see FIG. 2).

Furthermore, the cellulose in the dope of the present invention is different from the cellulose in the cuprammonium solution or viscose solution customarily used on an industrial scale in that in its dissolved state, there is no specific coordination of the alkali and no derivatization of cellulose, and therefore in the case of the cellulose dope of the present invention, the so-called regeneration operation need not be carried out in the shaping process.

The cellulose in the dope of the present invention has a degree of polymerization of at least 100, preferably 200 to 700. If cellulose has a degree of polymerization higher than 700, the cellulose is not suitable for the shaping operation because the viscosity of the dope is high and the dope is readily gelled. However, this problem can be solved if the shaping operation is carried out by using an extruder or the like immediately after the preparation of the dope. Accordingly, the upper limit of the degree of polymerization is not particularly critical in the present invention.

The cellulose dope of the present invention can be obtained by subjecting cellulose (the crystal form is not particularly critical) to a preliminary treatment to form cellulose in which the $C_3$–$O_5'$ intramolecular hydrogen bond (between OH at the $C_3$-position and the oxygen of the glucose ring) and the $C_2$–$C_6'$ intramolecular hydrogen bond (between OH at the $C_2$-position and oxygen at $C_6$-position or between oxygen at $C_2$-position and OH at the $C_6$-position; dash(') denotes the carbon in the adjacent glucose ring to a given glucose ring) are weak and then dissolving this cellulose in an aqueous alkali solution at a low temperature.

An example of the cellulose to be used for the preparation of the dope of the present invention is obtained by maintaining a mixture of cellulose having a crystal form of cellulose I (natural cellulose) or cellulose having a crystal form of cellulose II, III, or IV (regenerated cellulose) and a hydrogen bond-cleaving agent at a temperature of 100° C. to 350° C. under a pressure of 10 to 250 atmospheres and abruptly exposing the cellulose to the ambient atmosphere at normal temperature.

The temperature and pressure under which the mixture of cellulose with a hydrogen bond-cleaving agent is maintained, interrelate with each other and, for example, the pressure is generally equivalent to a vapor pressure of a volatilizable component in the hydrogen bond-cleaving agent at a specific temperature. Accordingly, the maintaining temperature must be lower than the thermal decomposition point of the cellulose (350° C.). If re-utilization of the volatilizable component other than water is intended, the operation should be carried out at a temperature lower than the thermal decomposition point of the volatilizable component. Where an outer pressure other than the vapor pressure, for example, a pressure given by an extruder, is applied, the treatment temperature should be appropriately elevated depending upon the outer pressure. The time for maintaining the cellulose in the above-mentioned environment is not particularly critical and this time is determined so as not to bring about thermal decomposition of the cellulose. Ordinarily, it is sufficient if the cellulose is maintained for 20 seconds to 20 minutes in the above-mentioned environment.

It is preferred that the amount of the hydrogen bond-cleaving agent be 10 to 1000% by weight based on the weight of dried cellulose. If the amount of the hydrogen bond-cleaving agent is smaller than 10% by weight based on the cellulose, the destruction of the interior of the cellulose (destruction of the intramolecular hydrogen bond) caused by abrupt evaporation of the volatilizable liquid in the hydrogen bond-cleaving agent is insufficient when the mixture of the cellulose and the hydrogen bond-cleaving agent is exposed to the ambient atmosphere from the high-temperature and high-pressure atmosphere. Consequently, the resulting cellulose has a poor solubility in an alkali at a low temperature. If the amount of the hydrogen bond-cleaving agent is larger than 1000% by weight based on the cellulose, the energy cost is increased.

As the hydrogen bond-cleaving agent, there can be used, for example, water, an aqueous solution of an alkali, an aqueous solution of an inorganic acid, an aqueous solution of a salt, an aqueous solution of hydrogen peroxide, an aqueous solution of a urea compound, an aqueous solution or dispersion of an amphoteric oxide or amphoteric hydroxide, a glycol, an amide, a sulfoxide, a halogenated acetic acid, and a polyphenol. Of course, a mixture of two or more of the foregoing agents may be used. In the case of a hydrogen bond-cleaving agent in the form of an aqueous solution or dispersion, the main component of this agent may be supplied in the solid state to cellulose swollen with water. The concentration of the main component based on water to be supplied to the cellulose is not particularly critical. The saturation concentration of the main component in water is regarded as the upper limit.

Supposing that the molecular chain of the cellulose to be treated is completely constructed through intramolecular hydrogen bonds (one hydrogen bond per glucose residue), the main component can be added in an amount of 1 to 3 equivalents to the hydrogen band. The addition of a larger amount of the main component is economically disadvantageous. In the case of an acidic aqueous solution, if the pH value is too low, degradation of the cellulose takes place to an undesirably large extent. Accordingly, the amount of the acid should be appropriately adjusted. Ordinarily, for an acidic aqueous solution, the concentration is preferably lower than 10% by weight. Since the dope of the present invention is an aqueous alkali solution containing the treated cellulose in the dissolved state, excessive use of an acidic aqueous solution at the step of treating the cellulose is not preferred from the economical viewpoint. From the viewpoint of the safety, it is necessary that an oxidative substance such as nitric acid, hydrogen peroxide or perchloric acid should be used at a low concentration in an amount as small as possible.

As the aqueous alkali solution to be used as the hydrogen bond-cleaving agent, there can be mentioned aqueous solutions of sodium hydroxide, potassium hydroxide, lithium hydroxide, beryllium hydroxide, calcium oxide, sodium silicate, sodium carbonate, and tetra-alkyl ammonium. As the aqueous solution of an inorganic acid, there can be mentioned aqueous solutions of sulfuric acid, hydrochloric acid, phosphoric acid, orthophosphoric acid, metaphosphoric acid, pyrophosphoric acid, perchloric acid, hypochlorous acid, chlorous acid, nitrous acid, sulfurous acid, and boric acid. As the aqueous solution of a salt, there can be mentioned aqueous solutions of lithium chloride, zinc chloride, calcium thiocyanate, ammonium thiocyanate, and sodium thiocyanate. Oxides and hydroxides of aluminum and zinc are preferably used as the amphoteric oxide and hydroxide.

The above-mentioned cellulose treatment can be carried out either batchwise or in a continuous manner. In the case of the batchwise treatment, a mixture of cellulose and a hydrogen bond-cleaving agent is charged in a pressure vessel, and the mixture is externally heated at 100° C. to 350° C. and allowed to stand in an atmosphere of the vapor pressure of the volatilizable component in the mixture for several seconds to several minutes. Then, a valve and nozzle attached to the pressure vessel are opened to abruptly reduce the pressure in the pressure vessel, whereby the treatment is completed. The obtained cellulose is fed to the subsequent dissolving step, if necessary after water washing and drying. In the case of the continuous treatment, the above-mentioned mixture is supplied to an externally heated monoaxial or biaxial screw type extruder, where the mixture is compressed by the vapor pressure of the volatilizable component in the mixture and by the pitch arrangement of screws of the extruder and thereby discharged from the tip end of the extruder. In this case, external heating may be effected on respective zones independently of the extruder, and mixing of the cellulose with the hydrogen bond-cleaving agent may be performed in the extruder. More specifically, there may be adopted a method in which the hydrogen bondcleaving agent is injected under pressure through an inlet formed on the side portion of the extruder into the extruder while the cellulose is supplied into the extruder by a feed screw. An optional combination of a feed screw, a reverse screw, and a seal screw may be used as the screw.

The polymerization degree of the cellulose may be adjusted by an acid or alkali before the above-mentioned treatment or may be adjusted during the above operation. At any rate, the degree of polymerization is adjusted to at least 100. Finally, the mixture of the thustreated cellulose and the hydrogen bond-cleaving agent is subjected to water washing or the like to remove the foreign matter and is then dried. The component in the hydrogen bond-cleaving agent, which has no adverse effect on the solubility of the cellulose, may be left in the treated cellulose. In principle, a substance having no acidity may be left in the treated cellulose.

The cellulose dope of the present invention can also be prepared according to the following procedures. Namely, cellulose having a crystal form of cellulose I is mixed with a solvent capable of dissolving cellulose to destroy the crystal form of cellulose I, and a part of the volatile solvent component is removed from the mixture to effect solidification or the mixture is introduced into an organic solvent to effect solidification. The solidified cellulose is then regenerated. The regenerated cellulose is mixed with an aqueous alkali solution maintained at a temperature not higher than 50° C. and stirring the mixture at a temperature not higher than 10° C. to dissolve the cellulose in the aqueous alkali solution. As the cellulose solvent, there can be mentioned, for example, a cuprammonium solution, an aqueous solution of phosphoric acid having a concentration of about 82%, an aqueous solution of hydrochloric acid having a concentration of 30%, an aqueous solution of sulfuric acid having a concentration of about 75%, an aqueous solution of calcium thiocyanate having a concentration of 70%, an aqueous solution of lithium chloride having a concentration of 70%, a liquid ammonia/salt mixture, and cellulose solvents composed mainly of so-called organic solvents, which have recently been developed, such as dimethylformamide/chloral, halogenated hydrocarbon/$SO_2$-amine complex, dimethylsulfoxide/paraformaldehyde, N-ethylpyridium chloride, N-methylmorpholine-N-oxide, dimethylformamide/$N_2O_4$, and dimethylformamide/$SO_3$. A solvent such as mentioned above is mixed with cellulose in an amount of at least 1 part by weight per part by weight of the cellulose. In the case of a solvent containing a volatilizable component which is easily vaporized at room temperature in a short time, this volatilizable component is evaporated to effect solidification, and then neutralization and regeneration are conducted to obtain cellulose used for the production of the dope. As the solvent of this type, there can be mentioned a cuprammonium solution, a liquid ammonia/salt mixture, and a halogenated hydrocarbon/$SO_2$-amine complex. In the case of a solvent having a strong moisture-absorbing property, a mixture of the cellulose and solvent is introduced into an organic solvent such as alcohol or acetone to effect solidification, followed by regeneration to obtain cellulose used for the production of the dope. The solidification treatment is performed so as to inhibit regeneration of the intramolecular hydrogen bond in the solidified cellulose. There is no upper limit of the amount of the solvent to the cellulose, but the amount of the solvent should be determined from the economical viewpoint, for example, while repeated use of the solvent is taken into consideration. If the amount of the solvent is smaller than 1 part by weight per part by weight of the cellulose, uniform mixing of the cellulose with the solvent cannot be attained and it becomes difficult to obtain the intended cellulose.

The thus-obtained cellulose is dipped in an aqueous alkali solution having a concentration of 6 to 12% by weight at a temperature not higher than 50° C. and the mixture is stirred by a dissolver, or the cellulose is directly introduced into an aqueous alkali solution at a temperature not higher than 10° C., preferably not higher than 7° C. and the mixture is stirred, whereby the cellulose is dissolved to form the dope of the present invention. Furthermore, the dope of the present invention can be obtained by dipping the treated cellulose in an aqueous alkali solution at a temperature not higher than 50° C., freezing the mixture, and then dissolving the frozen mixture at a temperature not higher than 10° C., preferably not higher than 7° C. By the term "alkali" used herein are meant sodium hydroxide, potassium hydroxide, lithium hydroxide, beryllium hydroxide, and cesium hydroxide. Of these, sodium hydroxide is preferred from the economical viewpoint.

In the dope of the present invention, the cellulose is dissolved in the state where, as pointed out hereinbefore, there is neither an interamolecular hydrogen bond nor a specific coordination of the alkali to the glucose ring. This dissolved state is quite different from the dissolved state in a cuprammonium solution or viscose solution. Accordingly, it is characteristic that a cellulose shaped article prepared from the dope of the present invention becomes quite different from the cellulose shaped articles prepared from the known dopes.

Shaping of the dope of the present invention can be accomplished by using an ordinary extrusion apparatus. Namely, the dope is extruded from a spinneret or slit, coagulated, drawn and then neutralized, whereby the dope is shaped into a fiber or a film. Since the cellulose is completely molecularly dispersed in the dope of the present invention, when the dissolved cellulose is solidified by neutralization, a higher-order structure is readily formed. The most characteristic feature of a cellulose shaped article obtained from the dope of the present invention is that the shaped article has a higher intramolecular hydrogen bond-forming ability than that of a known regenerated cellulose fiber or film. The intramolecular hydrogen bond-forming ability can be evaluated by the infrared absorption or NMR analysis. Since the shaped article obtained from the dope of the present invention has a high intramolecular hydrogen bond-forming ability as pointed out above, the shaped article has excellent mechanical properties and chemical resistance.

Since the dope of the present invention does not contain a toxic gas or a heavy metal, the treatment of the surface or interior of other material or shaped articles becomes possible with the dope of the present invention, though industrial working of this treatment according to the conventional techniques is impossible because of occurrence of environmental pollution or the like. Namely, the surface or interior of other material or shaped articles can be easily treated with a cellulose by dipping the material or shaped articles in the dope of the present invention or an aqueous alkali dilution thereof and removing the excessive cellulose solution by a press, a roll or a doctor knife, or by spraying or coating the cellulose solution on the material or shaped articles, and then heat-treating the material or shaped articles and effecting neutralization. If this treatment is applied to a synthetic fibrous material, a very durable antistatic effect or moisture-absorbing effect can be attained, and in some cases, the lowering of physical properties by heat treatment can be prevented or the adhesiveness can be improved. Furthermore, the dope of the present invention can be used for improving the hand of a textile material. Moreover, if the dope of the present invention is coated on a shaped article of an inorganic substance such as mortar or concrete, a moisture condensation-preventing effect can be attained. In addition, if the dope of the present invention is mixed with mortar or cement in advance, an effect of reinforcing the shaped article can be attained.

Where the dope of the present invention is applied to a polyester fibrous material, under certain treatment conditions (treatment temperature and time and alkali concentration), the fibrous material can be modified and improved by performing the treatment with the dope of the present invention accompanying the so-called weight reduction treatment of polyester fiber by alkali. Furthermore, if the dope of the present invention is applied to a polyacrylonitrile fibrous material with heating, the nitrile group of the polyacrylonitrile molecule is converted to an amide-oxime group or carboxyl group by the action of the alkali, and therefore, a modifying effect due to chemical modification is given to the fibrous material. Moreover, if the dope of the present invention is applied to a cotton or regenerated cellulose fiber, modification with a mercerizing effect can be attained. Since the alkali is contained in the dope of the present invention, attainment of various secondary effects can be expected, and an inexpensive and safe modification method can be provided. Of course, this modifying effect can be similarly attained when the dope of the present invention is applied to materials other than the above-mentioned fibrous materials.

The present invention will now be described in detail with reference to the following examples that by no means limit the scope of the invention.

EXAMPLE 1

This example illustrates the process for preparing an alkali-soluble cellulose directly from natural cellulose having a crystal form of cellulose I by using a twin-screw extruder type high-temperature high-pressure apparatus.

As the starting cellulose, there were used a saiccor pulp having an average degree of polymerization 910 obtained from eucalyptus and an acid-hydrolysis product thereof (depolymerized pulp) having an average degree of polymerization degree 580. A twin-screw extruder (Model α-100 supplied by Suehiro Tekkosho) was used as the high-temperature high-pressure apparatus. This extruder was characterized by a treating capacity of 50 to 100 kg/hr, a screw rotation of 65 to 260 rpm, a temperature control range of up to 300° C., a pressure resistance of up to 200 kg/cm$^2$, a screw diameter of 80 mm, and a screw length of 640 mm (one screw consisting of 5 screw units). In this example, the screw system comprised a feed screw (I) having a pitch of 50 mm, a seal screw, a feed screw (II) having a pitch of 35 mm, a feed screw (III) having a pitch of 30 mm, and a reverse screw having a pitch of 20 mm. A die having a diameter of 10 mm was provided on the tip end of the extruder for extruding a material to be treated. The temperature was set at 150° C., except for the feed screw (I) and seal screw zones. The temperature was measured at the die zone, the reverse screw zone, and the feed screw zone. The pressure was measured at the die zone and the reverse screw zone. This pressure was the shearing pressure, but was not the vapor pressure of the volatilizable component in the hydrogen bond-cleaving agent. The screw rotation was set at 120 rpm. In practical operation, the cellulose was immersed in water (the amount of water was 20 times the amount of the cellulose on the weight basis) and the mixture was stirred to form a slurry. The slurry was dehydrated and water as a hydrogen bond-cleaving agent was then set in an amount of 3 parts by weight per part by weight of the cellulose. The resulting mixture was supplied to the above-mentioned twin-screw extruder at a rate of 20 kg/hr.

The pressure under which the saiccor pulp and its acid hydrolysis product were treated was 20 to 50 kg/cm$^2$. In each case, the treated cellulose was a white powder containing water in an amount of scores of % by weight. The powdery celluloses were vacuum-dried at 40° C. for 24 hours. When the viscosities in Cadoxene were measured, it was found that the degree of polymerization were 760 and 420, respectively. Then, the powdery celluloses were subjected to the evaluation of the solubility in an aqueous alkali solution. As the alkali, an aqueous sodium hydroxide solution of 9.1% by weight was used, and a Henschel type dissolver having a capacity of 5 l was used as a dissolver. The dissolving temperature was 5±5° C. The concentration of cellulose was set 6.5% by weight and the dissolution time was 2 hours. Each of the thus-treated celluloses of saiccor pulp and its acid hydrolysis product was in the form of a viscous transparent lustrous solution. A part of the solution was taken and a small amount of heavy water added thereto and used as the lock signal, and the $^{13}$C-NMR spectrum was recorded and obtained the results shown in FIG. 1a. Apparently, the C$_4$ carbon atom was observed as a single sharp peak at 79.9 ppm. When the dissolution state was observed by an optical microscope under Nicol's prisms, in the case of the saiccor pulp the presence of a slight amount of undissolved fibers was observed, but these could be sufficiently removed by filtration using a filter press or the like. And, in the case of the treated acid hydrolysis product, the presence of undissolved particles was not observed and it was confirmed that a very homogeneous solution was formed. The solution was stable at room temperature for 3 to 5 days.

When the untreated cellulose was dissolved under the same conditions, an opaque liquid having a low viscosity was formed. Substantially all of the view field of an optical microscope under cross Nicol's prisms was a bright field by the existence of the undissolved portion. It was almost impossible to remove this undissolved portion by a filter press or the like. When CP/MAS $^{13}$C-NMR spectrum of the opaque liquid was measured, a sharp peak was observed at 80 ppm and considerably broad peaks were further observed at 87.8 ppm and 85–82 ppm.

The acid-hydrolyzed saiccor pulp was treated in the same manner as described above except that the amount of water as a hydrogen bond-cleaving agent was changed to 0.1 part by weight. A slightly fibrilated powdery product was obtained, and the degree of polymerization was reduced to 320 from 580. When the powdery product was dissolved according to the above-mentioned procedures, the solubility was improved over that of the untreated pulp, but the presence of a considerable undissolved portion was optically observed.

EXAMPLE 2

In this example, by using the same two-screw extruder as used in Example 1 and adopting the same conditions as adopted in Example 1, a hydrogen bond-cleaving agent shown in Table 1 was added to a cellulose in an amount shown in Table 1, and the treated cellulose was dissolved at a cellulose concentration of 6.5% by weight in the same manner as described in Example 1, after or without removal of the foreign substances. The obtained results are shown in Table 1. In Table 1, "o" indicates that the dope of the present invention was obtained, "Δ" indicates that a dope was obtained in which the undissolved portion content was about 10% by weight and the solubility was considerably improved over that of the untreated pulp, and "x" indicates that a dope almost similar to that of the untreated cellulose was obtained. The starting celluloses used in this example were Alska Pulp A (DP =750), cotton linter B (DP =1100), and a fiber (C) (DP =550) regenerated from a cuprammonium solution.

As is apparent from the results shown in Table 1, dopes of the present invention can be prepared by using hydrogen bond-cleaving agents. Furthermore, it is seen that a substance left in the treated cellulose sometimes shows an adverse effect when the treated cellulose is dissolved in an aqueous alkali solution. Accordingly, this point should be taken into consideration at the actual operation.

In each of the $^{13}$C-NMR spectra of the dopes of the present invention indicated by "o", the $C_4$ carbon atom was observed as a single sharp peak at 80–79 ppm.

EXAMPLE 3

This example illustrates a process for treating a cellulose according to the so-called explosion method, wherein a mixture of the cellulose and water is maintained under high-temperature and high-pressure conditions for a short time and the mixture is then promptly discharged into the open air, and a process for preparing a dope comprising this treated cellulose and an aqueous alkali solution.

A wood pulp treated with 5N sulfuric acid at 60° C. for 90 minutes was used as the natural cellulose. When the viscosity of the cellulose in Cadoxene was measured, it was found that the degree of polymerization of the cellulose was about 600. A slurry mixture was formed by immersing 500 g of the cellulose in 5 l of water as a hydrogen bond cleaving agent and stirring the mixture. Then, the mixture was charged in an autoclave having a capacity of 180 l. A silicone oil heated at 270° C. was circulated in a jacket of the autoclave, and when five minutes had passed from the point when the temperature in the autocalve reached 250° C., a reducing valve was promptly opened to reduce the pressure. Then, 4650 g of an aqueous sodium hydroxide solution having a concentration of 9% by weight was poured into a Henschel dissolver equipped with a jacket, the temperature of which was controlled to 20° C., and 350 g of the obtained cellulose was gradually added thereto with stirring. When 30 minutes had passed from the point of completion of the addition of the cellulose, the jacket temperature was lowered to −10° C. and stirring was conducted for 3 hours. When the obtained solution was observed by an optical microscope under cross Nicol's prisms, almost no undissolved particles were found.

The cellulose solution was diluted to a cellulose concentration of 5% by weight by an aqueous deuterated sodium hydroxide solution having a concentration of 9% by weight, and the $^{13}$C-NMR spectrum was measured. A spectrum similar to that shown in FIG. 2 was obtained.

TABLE 1

| Starting Cellulose | Hydrogen Bond-Cleaving Agent | Mixing Ratio (per 100 wt. parts of cellulose) (molar ratio/glucose residue) | DP of Treated Cellulose | Properties of Dope Before removal of residual foreign substance | Properties of Dope After removal of residual foreign substance |
|---|---|---|---|---|---|
| A | NaOH/H$_2$O | 20/280 (= 0.8/25.2) | 420 | o | o |
|  |  | 54/246 (= 2.16/22.1) | 400 | Δ | o |
|  |  | 6/294 (= 0.24/26.4) | 700 | Δ | o |
|  | HCl/H$_2$O | 6/294 (= 0.26/26.4) | 320 | o | o |
|  |  | 30/270 (= 1.3/24.5) | <100 | — | — |
|  | Ca(SCN)$_2$/H$_2$O | 62/138 (= 1.0/12.8) | 600 | Δ | o |
|  |  | 62/238 (= 1.0/22.4) | 600 | Δ | o |
|  |  | 132/138 (= 2.0/12.8) | 600 | Δ | o |
| B | Al(OH)$_3$/H$_2$O | 48/152 (= 1.0/13.7) | 800 | o | o |
|  |  | 96/204 (= 2.0/18.4) | 720 | Δ | o |
|  |  | 144/156 (= 3.0/14.0) | 640 | Δ | o |
|  | O<br>‖<br>H$_2$N—C—NH$_2$/H$_2$O | 37/263 (= 1.0/23.7) | 820 | o | o |
|  |  | 20/280 (= 0.54/25.2) | 840 | Δ | o |
|  |  | 70/230 (= 1.90/20.7) | 800 | o | o |
|  | DMSO | 35 (= 0.9) | 790 | x | x |
|  |  | 286 (= 7.3) | 630 | x | o |
| C | Dichloroacetic acid | 79 (= 1.0) | 290 | x | o |
|  | Ethylene glycol | 38 (= 1.0) | 500 | x | x |
|  |  | 190 (= 5.0) | 500 | Δ | o |
|  | Sulfuric acid/H$_2$O | 3/297 (= 0.05/26.7) | 275 | Δ | o |
|  |  | 9 (291) (= 0.15/26.5) | 230 | x | o |

The cellulose solution was cast at a thickness of 500 μm on a glass sheet by using a knife coater and the cast solution was coagulated by an aqueous sodium sulfate solution having a concentration of 10% by weight. The formed film was washed with 2% by weight sulfuric acid, washed with water, and then dried. The film was transparent and had a strength sufficient for the practical use.

EXAMPLE 4

This example illustrates various dopes formed by dissolving the acid-hydrolyzed saiccor pulp treated in Example 1 in various aqueous alkali solutions differing in concentration. The dissolution conditions and the properties and stability of the dopes are shown in Table 2. The dissolution was performed by using a Henschel type mixer.

TABLE 2

| Run No. | Aqueous Alkali Solution Used | Cellulose Concentration (% by weight) | Dissolution Conditions | Properties of Dope | |
|---|---|---|---|---|---|
| | | | | Undissolved Substances | Stability |
| 1 | 6% Cs(OH)$_2$ | 6 | Immersed at 45° C., frozen at −11° C., dissolved at 0–5° C. | None | Good |
| 2 | " | 8 | Immersed at 5° C., dissolved at 5–7° C. | None | Good |
| 3 | " | 6 | Immersed at 60° C., frozen at −11° C., dissolved at 0–5° C. | Slight | Medium |
| 4 | 9.1% NaOH | 4 | Immersed at 50° C., frozen at −9° C., dissolved at 0–5° C. | Trace | Good-medium |
| 5 | " | 8 | Immersed at 25° C., frozen at −9° C., dissolved at 0–5° C. | None | Good |
| 6 | " | 8 | Immersed at 5° C., dissolved at 5–7° C. | None | Good |
| 7 | " | 4 | Immersed at 55° C., frozen at −9° C., dissolved at 0–5° C. | Large | Poor |
| 8 | 6% NaOH | 4 | Immersed at 5° C., dissolved at 5–7° C. | None | Good |
| 9 | 10% KOH | 8 | " | None | Good |
| 10* | 13% NaOH | 4 | " | Large | Poor |
| 11 | " | 4 | Immersed at 25° C., frozen at −11° C., dissolved at 0–5° C. | Large | Poor |

*Comparison

TABLE 3

| Run No. | Regeneration Conditions | Solubility |
|---|---|---|
| 1 (comparison) | Homogeneous solution was cast and immediately coagulated and regenerated in 5% sulfuric acid | Poor |
| 2 (comparison) | Homogeneous solution was cast, immediately coagulated in water for 30 minutes, and regenerated in 2% sulfuric acid | Poor |
| 3 (present invention) | Homogeneous solution was cast, immediately coagulated in acetone for 30 minutes, and regenerated in 2% sulfuric acid | Good |
| 4 (present invention) | Homogeneous solution was cast, ammonia was vaporized at 30° C. for 30 minutes, and regenerated in 2% sulfuric acid | Good |

EXAMPLE 5

This example illustrates an embodiment of the process for preparing cellulose used for the production of the cellulose dope of the present invention.

Natural cellulose (wood pulp) having a degree of polymerization reduced to 530 by the acid hydrolysis method (5N-H$_2$SO$_4$, 60° C., 100 minutes) was used as the starting cellulose.

Figures 3A, 3B:
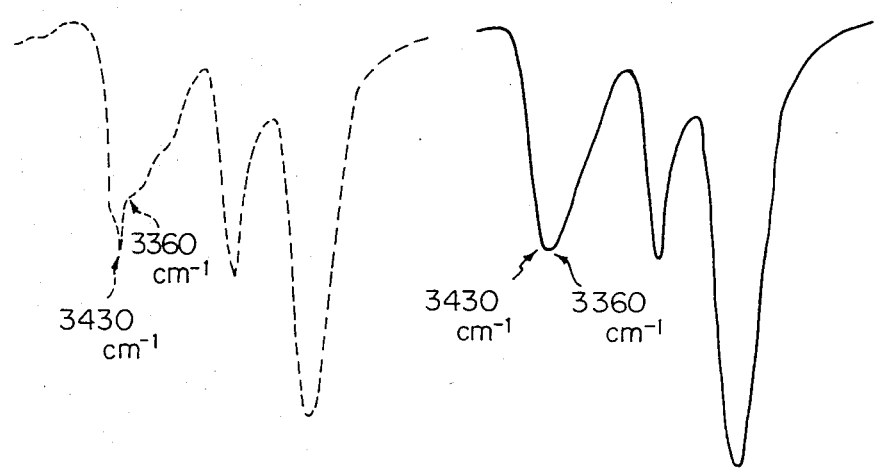
FIGS. 3a and 3b show IR spectra of ordinary regenerated cellulose and treated cellulose used in the present invention, respectively, both obtained after deuteration, in which a sharp absorption band attriubted to the intramolecular hydrogen bond is not observed at 3430 cm in the spectrum (FIG. 3b) of the cellulose used in the present invention.

First, 20 g of the cellulose was dissolved in 300 g of Schweitzer's reagent under cooling at 5° C. to 10° C. to form a homogeneous cellulose solution. The cellulose was coagulated and regenerated under the conditions shown in Table 3. The obtained cellulose was dissolved in an aqueous 9.1% by weight NaOH solution at a cellulose concentration of 8% by weight. The obtained results are shown in Table 3. In the $^{13}$C-NMR spectrum of the dope of the present invention, the C$_4$ carbon atom was observed as a single sharp peak at 80.0 ppm. It was found that the regenerated cellulose used for formation of the dope of the present invention, which was prepared in this example, had a lower intramolecular hydrogen bond-forming ability than that of the conventional regenerated cellulose, which was confirmed by the dueteration IR method (see FIG. 3b).

EXAMPLE 6

This example illustrates a treated cellulose used for the preparation of the cellulose dope of the present invention, which was prepared by a physical treatment conducted while using a hydrogen bond-cleaving agent.

A mercerized product (treated with an aqueous 18% by weight NaOH solution for 30 minutes, followed by water washing and drying) of the natural cellulose (DP = 530) used in Example 5 was used as the starting cellulose. First, 100 g of the cellulose was immersed in a hydrogen bond-cleaving agent shown in Table 4 for a predetermined time, and then the mixture was sufficiently kneaded by an extruder at a predetermined temperature. Then, the mixture was introduced in an acetone/metanol (1/1 volume ratio) to obtain the cellulose used in this invention, and the obtained cellulose was washed by the same solvent mixture, and dried in vacuum at room temperature. The dissolution state of the cellulose was examined. The obtained results are shown in Table 4.

Each cellulose had a good solubility in an aqueous 9.1% by weight NaOH solution. In the $^{13}$C-NMR spectrum of each of the dopes of the present invention, a single sharp peak attributed to the C$_4$ carbon atom was observed at 80 ppm.

TABLE 4

| Run No. | Hydrogen Bond-Cleaving Agent | Treatment temperature (°C.) | Treatment Time (minutes) | Solubility |
| --- | --- | --- | --- | --- |
| 5 (present invention) | DMSO/hydrazine, 1 mole/1 mole | 100 | 30 | Good |
| 6 (present invention) | Methylene chloride/SO$_2$/ethylene diamine, 5 mole/1 mole/1 mole | 50 | 30 | Good |
| 7 (present invention) | DMF/chloral, 10 moles/1 mole | 30 | 30 | Good |

EXAMPLE 7

A fibrous polymeric material shown in Table 5 was treated with a cellulose dope of the present invention comprising cellulose and an aqueous sodium hydroxide solution, obtained in Example 5, to give a moisture-absorbing property and an antistatic property to the fibrous polymeric material.

The cellulose dope was diluted with an aqueous sodium hydroxide solution having a concentration of 9.1% by weight so that the cellulose concentration was 1% by weight, whereby a homogeneous solution was obtained. Then, 5 g of a sample fabric was immersed in the solution maintained at 15° C. and impregnated sufficiently with the solution. The fabric was squeezed so that the solution pick-up was about 200% by weight. The fabric was immersed in an aqueous 1% by weight solution of sulfuric acid to effect neutralization. The sample was washed with running water and then dried at a temperature of 70° C. Each test was conducted after the treated fabric had been dyed under predetermined conditions.

TABLE 5

| Sample No. | Fibrous Polymeric Material | Half-Value Period (sec) | | Water-Absorbing Property (cm) |
| --- | --- | --- | --- | --- |
| | | before washing | after washing | |
| 1 | Polyester three-ply double-rib fabric | 3.8 | 8.3 | 3.9 |
| 2 | Polyester tricot | 6.2 | 19.4 | 3.0 |
| 3 | Polyamide three-ply double-rib fabric | 6.5 | 23.1 | 2.3 |
| 4 | Polyacrylonitrile taffeta | 6.8 | 18.3 | 7.8 |

Each fabric before the treatment had a half-value period of at least 90 seconds. Accordingly, it was confirmed that the application method of the present invention was very effective for imparting an antistatic effect.

In this example, the half-value period as one measure indicating the antistatic property was determined as follows.

The sample was conditioned in an artificial weather chamber maintained at a temperature of 20° C. and a relative humidity of 40%. The time required for the charge potential of the conditioned sample to be reduced to ½ was measured according to the method A of JIS L-1094. This time was shown as the half-value period.

The water-absorbing property was determined according to the Byrex method. Namely, one side end (the 2.5 cm side) of a fabric strip having a size of 23 cm and 2.5 cm was immersed in water for 10 minutes. At this point, the height (cm) of rising water absorbed was measured, and the water-absorbing property was indicated by the measured value.

The washing of the sample fabric was carried out according to the following procedures. Namely, the fabric was washed with water maintained at 40° C. for 50 minutes and then rinsed in running water for 10 minutes.

It was confirmed that the method of the present invention can be applied to other materials such as film materials, wall materials, and industrial materials, as well as the above-mentioned fibrous polymeric materials.

EXAMPLE 8

In this example, the acid hydrolysis product (depolymerized pulp) obtained in Example 1 was treated according to the present invention, the treated cellulose was dissolved in an aqueous alkali solution to obtain a cellulose dope, and a film was prepared from the cellulose dope.

Figure 4A:
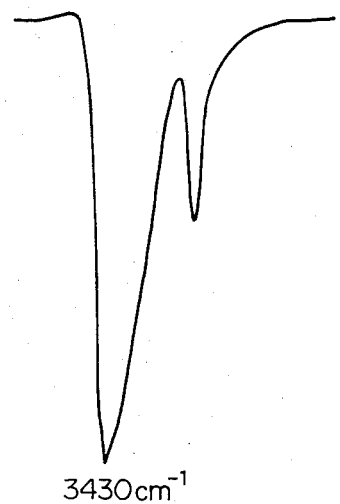
FIGS. 4a and 4b show IR spectra of shaped articles of cellulose of the present invention and ordinary regenerated cellulose, respectively, in which the shaped article of the present invention shows a strong absorption at 3430 cm$^{-1}$, which is attributed to the intramolecular hydrogen bond.
Figure 4B:
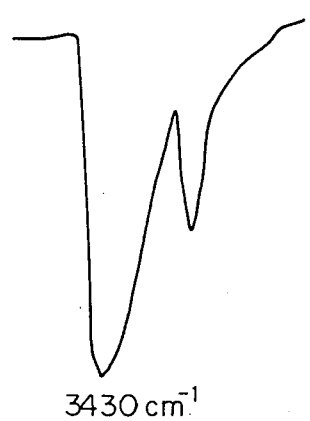

First, 350 g of the treated cellulose was introduced into 4650 g of an aqueous sodium hydroxide solution having a concentration of 9.1% by weight, which was cooled to 5° C., and the cellulose was dissolved under cooling by using a Henschel type dissolver. The viscosity of the obtained cellulose dope was 1300 poise at 20° C. The dope was cast at a thickness of 500 μm, on a glass sheet by using a knife coater, immersed in 5% by weight sulfuric acid for 20 minutes, washed with water, and then dried to obtain a transparent film. According to similar procedures, a thin film (8 μm) for the determination of the infrared absorption spectrum was prepared. From the infrared absorption spectrum (see FIG. 4), it was confirmed that the obtained film had a strong intramolecular hydrogen bond-forming ability. Accordingly, it was found that the dope of the present invention is very suitable for the production of a shaped article having an enhanced capacity. FIG. 4a shows the spectrum of the film obtained from the dope of the present invention, and FIG. 4b shows the spectrum of a film obtained from a cellulose cuprammonium solution, as described in Example 5.

We claim:

1. A cellulose dope suitable for shaping which comprises an aqueous alkali solution containing substantially at least 3% by weight of cellulose having a polymerization degree of at least 100, wherein in the $^{13}$C-NMR spectrum of said cellulose, the C$_4$ carbon peak is found at a magnetic field higher by at least 7 ppm than the magnetic field of the C$_4$ carbon peak of solid cellulose attributed to the strong intramolecular hydrogen bond.

2. A process for the preparation of the cellulose dope set forth in claim 1, which comprises the steps of:

maintaining a mixture comprising 100 parts by weight of cellulose, which may have any of crystal form, and 10 to 1000 parts by weight of a hydrogen bond-cleaving solution at a temperature of 100° C. to 350° C. under a pressure of 10 to 250 atmospheres, promptly discharging the mixture in the open air, and then, mixing the resulting cellulose with an aqueous alkali solution maintained at a temperature not higher than 50° C. and stirring the mixture at a temperature not higher than 10° C. to dissolve the cellulose in the aqueous alkali solution.

3. A process for the preparation of cellulose dope set forth in claim 1, which comprises the step of:

mixing cellulose having a crystal form of cellulose I with a solvent capable of dissolving cellulose, solidifying the mixture either by removing a part of the volatilizable solvent component or introducing the mixture into an organic solvent, regenerating the solidified cellulose, and, then, dissolving the regeneraged cellulose in an aqueous alkali solution at a temperature not higher than 10° C.

4. A cellulose shaped article having a well-developed intramolecular hydrogen bond which is prepared by introducing a cellulose dope as set forth in claim 1 into a coagulating bath and then into a neutralizing bath by using an extruder, and then drawing and winding the coagulated cellulose.

5. A cellulose dope suitable for shaping as recited in claim 1 wherein said cellulose is completely molecularly dispersed in said cellulose dope.

6. A process as defined in cliam 3 wherein said regenerated cellulose is dissolved in an aqueous alkali solution at a temperature not higher than 7° C.

* * * * *